United States Patent
Zhou et al.

(10) Patent No.: US 8,464,268 B2
(45) Date of Patent: Jun. 11, 2013

(54) DYNAMIC SCHEDULING OF JOBS/BATCHES USING EARLIEST COMPLETION TIME ALGORITHM IN CELLULAR MANUFACTURING WITH BATCH-SPLITTING OF JOBS ABOVE CERTAIN SIZE

(75) Inventors: Rong Zhou, San Jose, CA (US);
Sudhendu Rai, Fairport, NY (US);
Minh Binh Do, Palo Alto, CA (US)

(73) Assignees: Palo Alto Research Center Incorporated, Palo Alto, CA (US);
Xerox Corporation, Norwalk, CT (US)

( * ) Notice: Subject to any disclaimer, the term of this patent is extended or adjusted under 35 U.S.C. 154(b) by 749 days.

(21) Appl. No.: 12/558,879

(22) Filed: Sep. 14, 2009

(65) Prior Publication Data
US 2011/0066269 A1 Mar. 17, 2011

(51) Int. Cl.
*G06F 17/00* (2006.01)

(52) U.S. Cl.
USPC ............ 718/105; 718/104; 700/101; 700/102

(58) Field of Classification Search
USPC .................................................. 718/104, 105
See application file for complete search history.

(56) References Cited

U.S. PATENT DOCUMENTS

| | | | |
|---|---|---|---|
| 6,711,607 B1 * | 3/2004 | Goyal | 709/203 |
| 6,856,845 B2 | 2/2005 | Fromherz et al. | |
| 6,895,292 B2 | 5/2005 | Fromherz et al. | |
| 6,993,400 B2 * | 1/2006 | Viassolo | 700/99 |
| 7,051,328 B2 | 5/2006 | Rai et al. | |
| 7,065,567 B1 | 6/2006 | Squires et al. | |
| 7,079,266 B1 | 7/2006 | Rai et al. | |
| 7,755,778 B2 * | 7/2010 | Rai et al. | 358/1.1 |
| 7,814,486 B2 * | 10/2010 | Papakipos et al. | 718/100 |
| 8,023,133 B2 * | 9/2011 | Kaneko | 358/1.15 |
| 8,028,293 B2 * | 9/2011 | Azar et al. | 718/105 |
| 2005/0264832 A1 | 12/2005 | Baum et al. | |
| 2006/0230403 A1 | 10/2006 | Crawford et al. | |
| 2007/0177189 A1 * | 8/2007 | German | 358/1.15 |
| 2007/0204226 A1 | 8/2007 | Hindi et al. | |
| 2007/0236724 A1 | 10/2007 | Rai et al. | |
| 2007/0247657 A1 | 10/2007 | Zhang et al. | |
| 2007/0247659 A1 | 10/2007 | Zhang | |
| 2008/0144084 A1 | 6/2008 | Rai | |
| 2008/0300706 A1 | 12/2008 | Ruml et al. | |

OTHER PUBLICATIONS

"FreeFlow Output Manager User Guide—Version 9.0", Sep. 30, 2010, pp. 1-368, Retrieved from the Internet: URL: http://download.support.xerox.com/pub/docs/FF_Output_Manager/userdocs/any-os/en_GB/701P50820_OutputMgr90_UserGuide.pdf, retrieved on Dec. 23, 2011. (downloaded in 5 parts: Cover to 2-46; 2-47 to 3-52; 3-53 to 4-70; 4-71 to A2; and A3 to Index p. 8).

Kerr, R.M., "A knowledge Based, Integrated Process Planning and Scheduling Ssytem for Document Preparation", Advances in Production Management Systems, Jan. 1, 1991, pp. 497-506.

* cited by examiner

*Primary Examiner* — Meng An
*Assistant Examiner* — Abu Z Ghaffari
(74) *Attorney, Agent, or Firm* — Fay Sharpe LLP

(57) ABSTRACT

The present application a new and improved system and method of enhanced Lean Document Production (LDP), which applies cellular manufacturing to document printing operations. The LDP process incorporates process friendly cells and, a push model to order to improve efficiency, reduce work in progress and smooth out the "frictions" in production environments. The current application presents an earliest-completion-time strategy for assigning jobs to cells and a dynamic-priority-based-batch-scheduling algorithm.

16 Claims, 13 Drawing Sheets

DYNAMIC SCHEDULING OF JOBS/BATCHES USING EARLIEST COMPLETION TIME ALGORITHM IN CELLULAR MANUFACTURING WITH BATCH-SPLITTING OF JOBS ABOVE CERTAIN SIZE

INCORPORATION BY REFERENCE

U.S. Patent Application No. 20070204226, by Hindi et al., entitled, "System And Method For Manufacturing System Design And Shop Scheduling Using Network Flow Modeling"; U.S. Patent Application No. 20040225394, by Fromherz et al., entitled, "Predictive And Preemptive Planning And Scheduling For Different Job Priorities System And Method"; U.S. Patent Application Publication No. 20080144084, by Rai, entitled, "Method For Managing One Or More Print Processing Queues"; U.S. Pat. No. 7,065,567, by Squires et al., entitled, "Production Server For Automated Control Of Production Document"; U.S. Pat. No. 7,079,266, by Rai, et al., entitled, "Printshop Resource Optimization Via The Use Of Autonomous Cells"; and U.S. Pat. No. 7,051,328, by Rai et al., entitled, "Production Server Architecture And Methods For Automated Control Of Production Document Management"; U.S. Patent Application Publication No. 20070236724, by Rai et al., entitled, "Print Job Management System"; U.S. Patent Application Publication No. 20070247657, by Zhang et al., entitled, "Print Job Management System"; and, U.S. Patent Application Publication No. 20070247659, by Zhang, entitled, "Print Job Management System", each of the above being incorporated herein by reference in their entirety.

BACKGROUND

The present exemplary embodiment relates to lean manufacturing and to Lean Document Production (LDP). It finds particular application in conjunction with document printing operations using process friendly cells and will be described with particular reference thereto. However, it is to be appreciated that the present exemplary embodiment is also amenable to other like applications.

Conventional print shops are organized in a manner that is functionally independent of the print jobs, the print job mix, and the total volume of print jobs passing through the system.

Thus, traditionally, a print shop would arrange its equipment such that all the printers are clustered in a "printers-only" area, all the inserters in an "inserters-only" area, and so on. The implication of this is that printers are only close to other printers and inserters only close to other inserters, effectively creating a separation between different types of machines that must be closely involved in order to get a single manufacturing job done. As a result, work in progress (WIP) in traditional print shops can be very high and, at the same time, the average job turn-around time is elongated. The LDP solution recognizes this "friction" in the document production process, and re-organizes the print shop layout to create process-friendly mini-shops called "cells" that eliminate much of these inefficiencies.

Particular examples of Lean Document Production (LDP) technology have been described, in U.S. Patent Application No. 20070204226, by Hindi et al., entitled, "System And Method For Manufacturing System Design And Shop Scheduling Using Network Flow Modeling"; U.S. Patent Application No. 20040225394, by Fromherz et al., entitled, "Predictive And Preemptive Planning And Scheduling For Different Job Priorities System And Method"; U.S. Patent Application Publication No. 20080144084, by Rai, entitled, "Method For Managing One Or More Print Processing Queues"; U.S. Pat. No. 7,065,567, by Squires et al., entitled, "Production Server For Automated Control Of Production Document"; U.S. Pat. No. 7,079,266, by Rai, et al., entitled, "Printshop Resource Optimization Via The Use Of Autonomous Cells"; and U.S. Pat. No. 7,051,328, by Rai et al., entitled, "Production Server Architecture And Methods For Automated Control Of Production Document Management". While the LDP solution contains an array of innovations to make document production a "lean" process, the concept of cellular manufacturing remains at the heart of this technology, and this has created a number of technical challenges, the most notable of which is how to schedule jobs efficiently in a manufacturing environment that is organized around the notion of cells. Besides the emergence of cells as new scheduling entities, there are a number of other issues that pose additional challenges to schedulers employed in LDP systems.

One issue is the heavy-tailed job size distribution, which refers to the fact that print jobs (especially the ones found in large print shops) vary significantly in sizes such that their distributions can no longer be sufficiently characterized by any "textbook" distributions (such as normal or exponential distributions) that have a finite variance. Given that many scheduling algorithms and systems assume quite the opposite (i.e., only dealing with distributions that are not heavy-tailed), new schedulers are needed to meet this challenge. Another issue is sequence-dependent setup costs, which refer to the fact that the time it takes to setup a job on a machine depends on the last job the same machine processed. For instance, if two consecutive jobs on the same machine share the same setup, then switching from one job to the other can be done much faster than if the machine is being asked to perform a different job. One example would be if a printer is printing envelopes of a certain size and the next job uses the same size envelopes. In this situation, the setup time for the next job would be faster than if the next job required different sized envelopes.

Existing schedulers take the form of a two-tiered scheduling approach in which a job is first assigned to a cell (or a sequence of cells if needed) by a shop-level scheduler, and since each cell has its own job queue, once a job is assigned to some cell, it is permanently bound to that cell until the job steps within the cell are finished. This strategy works well if the shop-level scheduler can accurately predict the workload of each cell at any moment and compute a mapping from jobs to cells in a way that keeps the utilization level of each cell as high (or evenly distributed) as possible. With current schedulers, however, there are situations in which this can be difficult to achieve. The reason is that the shop-level scheduler does not take into account detailed scheduling constraints within each cell while making its decisions. Factors such as the specific arrival and due dates of a job, the sequence-dependent setup costs, and the number of jobs with similar due dates scheduled in a single cell are not addressed by the shop-level scheduler. Obviously, all these unaddressed factors can (and usually do) contribute to the workload of a cell at any given time. Thus, any such fixed mapping from jobs to cells tends to overload some cells while leaving others idle from time to time.

Another area where improvements of existing LDP systems would be beneficial is in the area of "batch-splitting", which is a throughput-improvement strategy for handling large jobs in LDP systems. Batch-splitting chops a long job into a number of smaller units called "batches." At times batches may also be referred to as sub-jobs. The idea is to eliminate downstream waiting as soon as a small fraction of a long job is ready to flow through the system. Examples of systems employing the batch-splitting concepts are described, for example, in U.S. Patent Application Publications: U.S. Patent Application Publication No. 20070236724, by Rai et al., entitled, "Print Job Management System"; U.S. Patent Application Publication No. 20070247657, by Zhang et al., entitled, "Print Job Management System"; and, U.S. Patent Application Publication No. 20070247659, by Zhang, entitled, "Print Job Management System".

In these patent applications jobs are split at the shop level using a statistical method and the split jobs are routed to cells. This makes it hard for a cell-level scheduler to focus on jobs that still have a chance to be on-time by delaying the processing of batches that belong to already-late jobs. It is noted this problem is unlikely to be solved by assigning each batch a carefully-chosen fixed priority number when batch-splitting is done, because it is usually too early to tell if the job as a whole is going to be late or not.

The present application addresses these and other issues.

BRIEF DESCRIPTION

The present application presents a new and improved system and method of enhanced Lean Document Production (LDP), which applies cellular manufacturing to document printing operations. The LDP process incorporates process friendly cells and, a push model in order to improve efficiency, reduce work in progress and smooth out the "frictions" in production environments. The current application presents an earliest-completion-time strategy for assigning jobs to cells and a dynamic-priority-based-batch-scheduling algorithm.

DETAILED DESCRIPTION

The disclosed embodiments contemplate the use of a lean production process server (LPPS) running appropriate software to act as a scheduler for coordinating production of document processing jobs in a document factory (such as a print shop). The server exploits lean production techniques to control document processing jobs, and can be run on a number of different platforms, including but not limited to, UNIX and Windows ("UNIX" is a registered trademark of the Open Source Group, while "Windows" is a registered trademark of Microsoft Corporation) based-platforms. The server determines workflow priorities and manages workflow accordingly. Those skilled in the art will appreciate that the presently disclosed embodiments may also be practiced with platforms that run other varieties of operating systems. Moreover, the server need not run on a dedicated computer system but rather may run on another variety of electronic devices, such as a printer, copier, etc. Workflow priorities for document processing jobs can be determined by observing the various jobs processing units.

At least one illustrative embodiment disclosed herein presumes that the document factory has been partitioned into autonomous cells. Each cell is a logical grouping of resources in the document factory that is sufficient for completing at least one type of document processing job. Thus, a first cell may include a printer and binder whereas a second cell may include a copier and a collator. The LPPS is responsible for distributing document processing jobs among such cells in an efficient manner.

Figure 1:
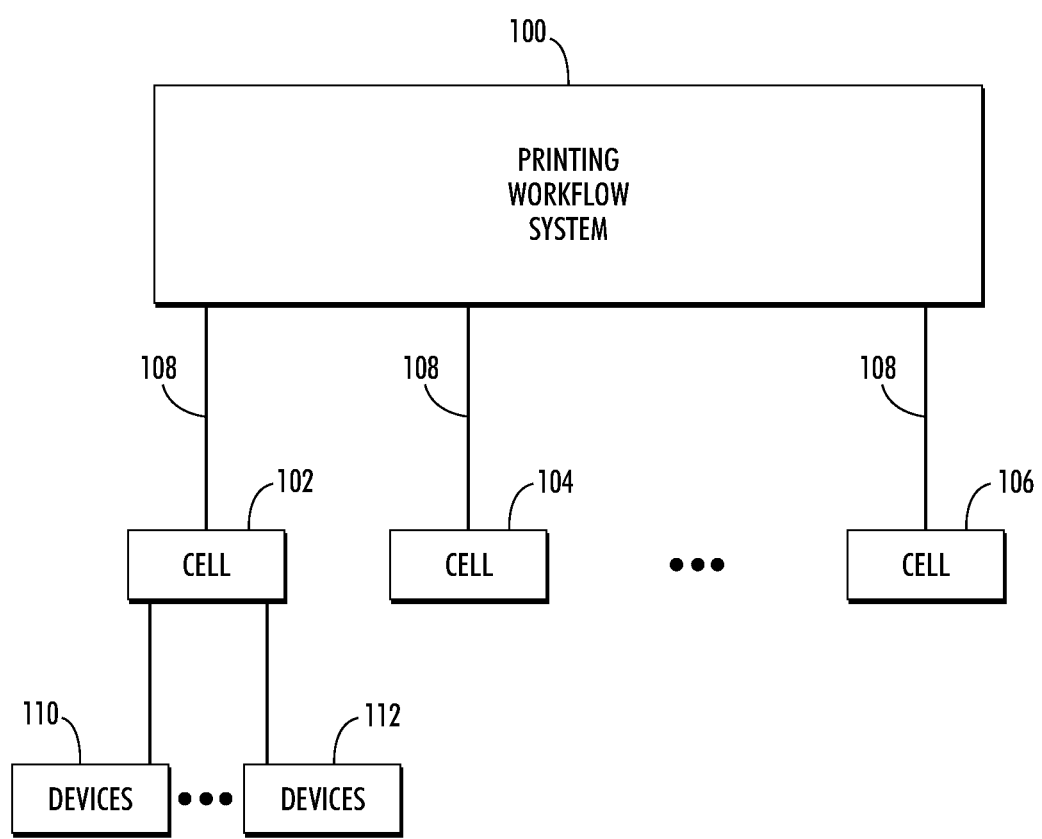
FIG. 1 is a block diagram illustrating a print workflow system in combination with cells and their corresponding devices.

Referring to FIG. 1 a printing workflow system 100 in a print shop (i.e., a document factory) is shown. The printing workflow system 100 controls a multitude of cells 102 through 106, and sends information to and receives information from the cells 102 through 106 via communication links 108. The cells 102 through 106 are comprised of at least one device for assisting in completing a document processing job of given product-types. For example, printing device 110 could be a 600 dpi monochrome printer, while printing device 112 could be a 1200 dpi color printer. These of course are only examples and many other processing devices may be within a cell.

Figure 2:
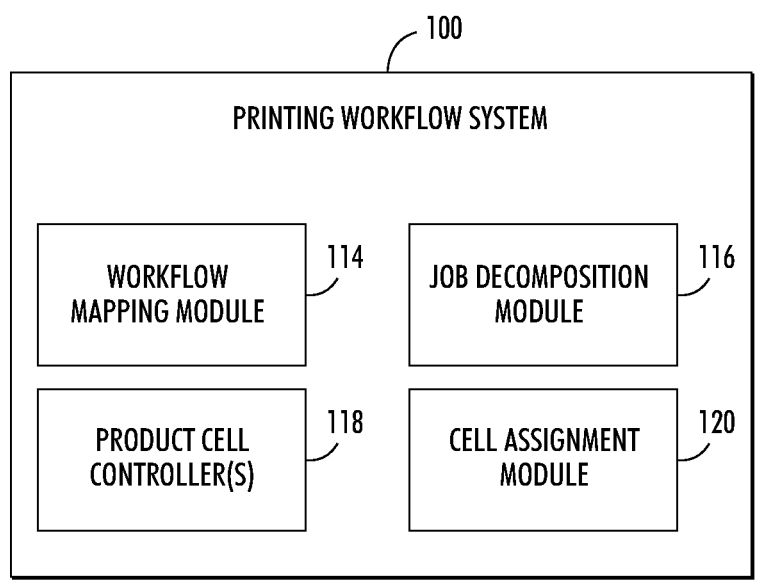
FIG. 2 is a block diagram including software components employed in the print workflow system of FIG. 1.

Referring to FIG. 2, several of the types of modules which may be employed in printing workflow system 100 are shown. These modules include a workflow mapping module 114 that determines the workflow for selected document processing jobs. The workflow module, among other things, identifies the operational steps needed to complete a document processing job, and the sequence in which these operational steps should be performed. A job decomposition module 116 is included for splitting the document processing jobs into batches or sub-jobs and for sending the batches to cells for completion. A product cell controller (PCC) 118 may be provided at given cells for receiving at least one batch to be processed by a device in the cell. Lastly, a cell assignment module 120 is provided for assigning batches to be processed by a cell.

In general, a print job is received, and a workflow is developed for the print job by workflow mapping module 114. Job decomposition module 116 may split the job into batches, with the batches or job then being assigned to cells (e.g., 102 through 106) for completion by cell assignment module 120. The batches may be sent to product cell controller 118 of the assigned cells, where each batch may be further sub-divided.

Figure 3:
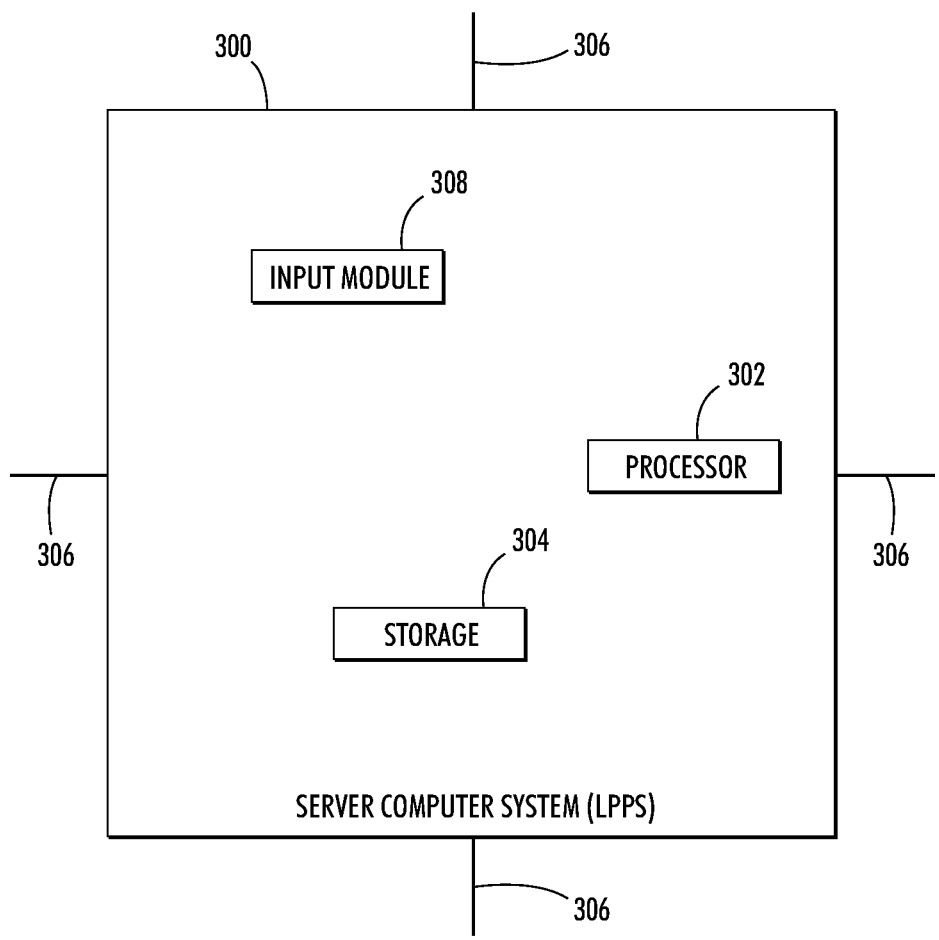
FIG. 3 is a block diagram of a server employing the printing workflow system of FIG. 1.

Referring to FIG. 3, illustrated is one example of a server 300 (i.e., LPPS) suitable for use in printing workflow system 100. Server 300 includes a processor 302, a memory storage 304, communication links 306, and an input module 308. The input module 308 is used to receive input from various devices via communications links 306. The input module 308 receives the document processing jobs on behalf of server 300. The processor 302 executes the programming instructions on server 300 to manage document processing jobs. The server 300 stores the instructions in storage 304. For example, data of modules 114, 116, and 118 (of FIG. 2) and other data may be stored in storage 304. Data of module 120 may be executed on server 300 or a separate server that is particular to a cell.

Figure 4:
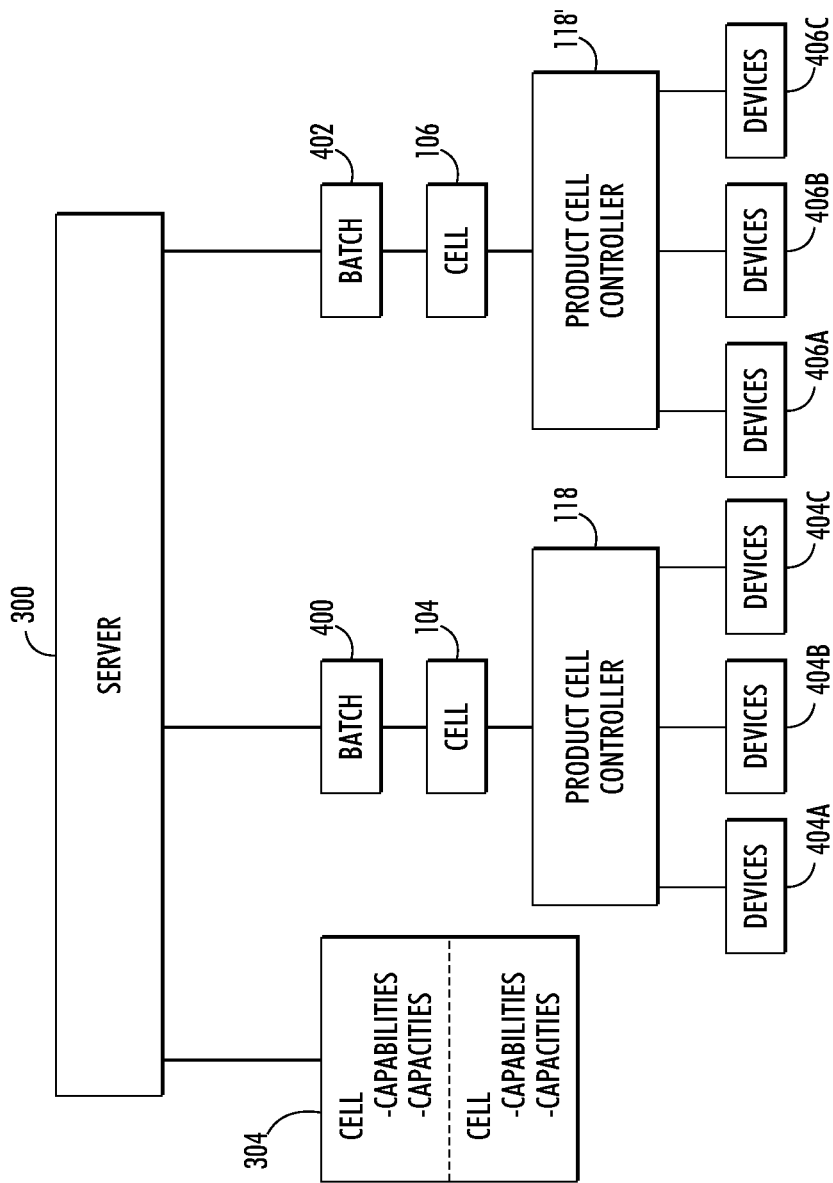
FIG. 4 is a block diagram illustrating how the print workflow system is used to accommodate the splitting of a document processing job into sub-jobs.

Referring to FIG. 4, shown is an arrangement with a server 300 of printing workflow system (such as printing workflow system 100 of FIG. 1) interacting with cells (e.g., 104 and 106 of FIG. 1) of a production system. The product cell controller 118 for the cell receives batches 400, 402 from the server 300 to be further processed by cells 104, 106. Server 300 stores, in storage 304, the capacities and capabilities of each cell in the print shop to produce different product-types. For example, cell 104 in the network may produce three different types of documents and cell 106 may produce two types of documents. It is mentioned that it is quite possible that two different cells can produce similar, or even the same, document types (i.e., a document type is uniquely characterized by the sequence of processing steps to completely finish the document). Server 300 stores this information to determine which cell has the capabilities to process a document job. The capacity of each cell is also stored to determine the volume of a particular product-type that a cell can produce.

As stated above, the job decomposition module 116 may split a document processing job into batches for transmission to various autonomous cells for processing. To the extent a cell in the network is autonomous, it can process a job completely. In the example shown in FIG. 4, a document processing job is split into batches 400 and 402 that are sent to cells 104 and 106, respectively. The product cell controllers 118 and 118' send the batches 400, 402 to device set 404A-404C and device set 406A-406C, respectively, for processing.

Figure 5:
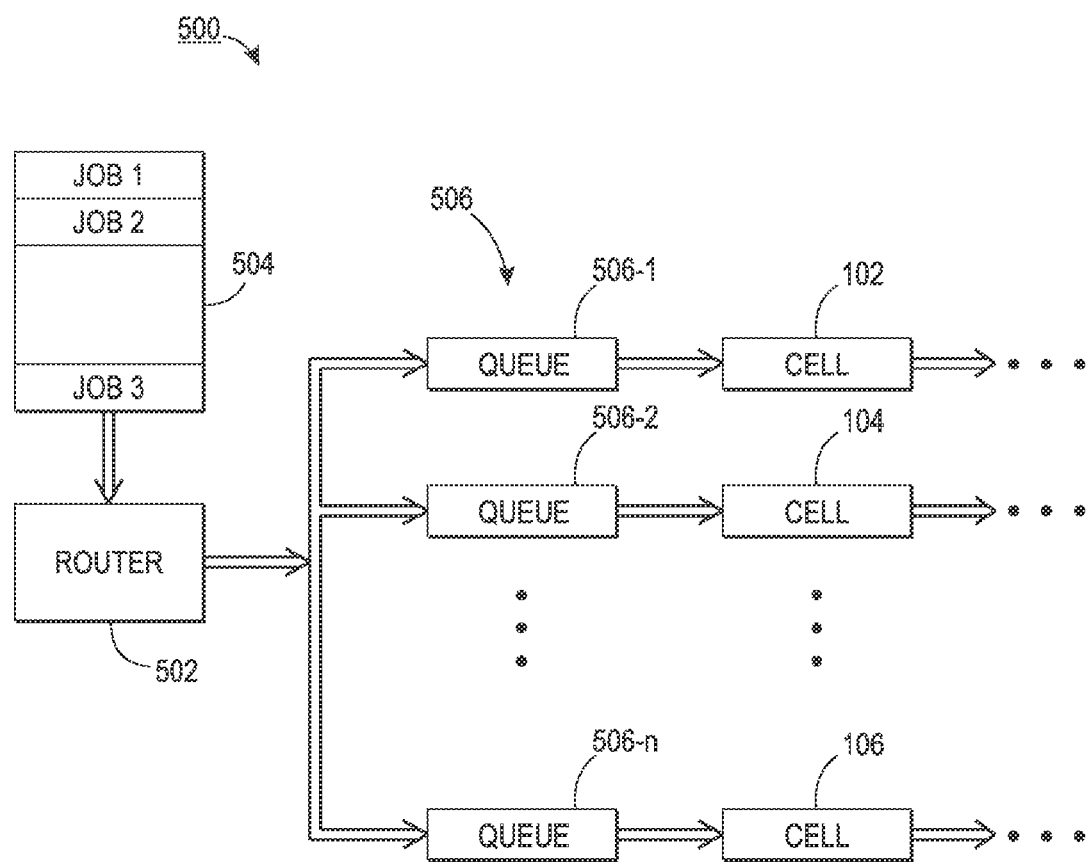
FIG. 5 is a block diagram illustrating an approach for routing jobs to cells by way of a corresponding series of queues.

Referring to FIG. 5, a simplified version of a job routing system 500, for use with the present embodiments, is illustrated. Router 502, which communicates with a bank of stored jobs 504, may include at least some of the job management capabilities associated with cell assignment module 120 (FIG. 2) and the LPPS 300 (FIG. 3). The router further communicates with a series of print processing related queues 506 (designated as 506-1, 506-2, . . . 506-n), which queues, in turn, are respectively operatively associated with cells 102 through 106.

Figure 6:
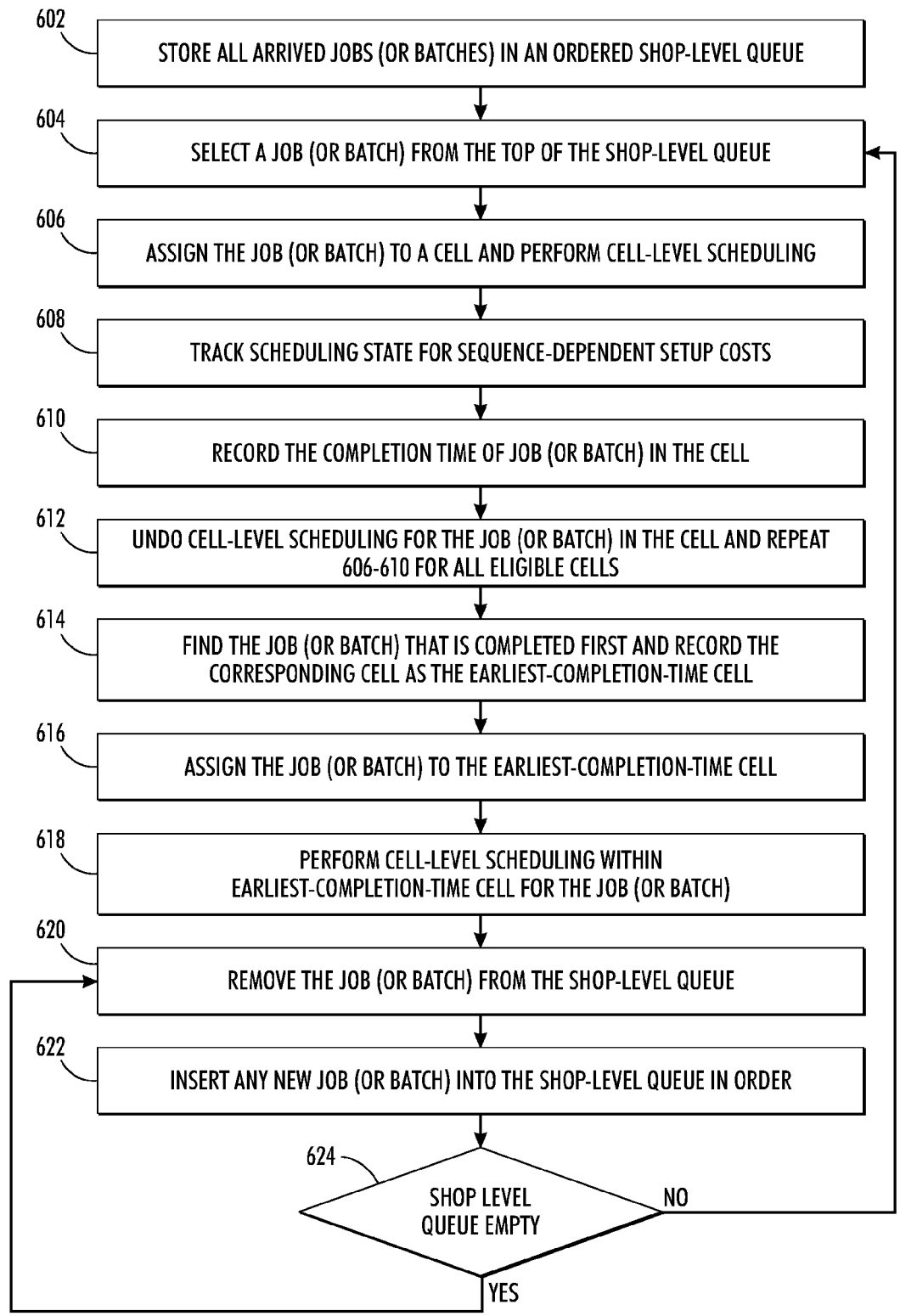
FIG. 6 presents a flowchart of the earliest-completion-time method.

Referring to FIG. 6 and Step 1-Step 8 of the pseudo code listed below, a scheduling embodiment which may be implemented in a system such as described in FIGS. 1-5 is set forth.

Step 1: Store all arrived jobs (or batches if batch-splitting is used) in a shop-level queue in the order of their due dates (or some other order such as their arrival dates or processing times).

Step 2: Pick or select a job, say $j_i$ (i∈[1, J]), from the head of the shop-level queue, and for each cell $c_j$ (j∈[1, C]) in the shop that is eligible for processing the job (J is a job or batch of a plurality of Jobs or Batches, and C is a cell of the plurality of cells):

Step 2a: Assign job $j_i$ to cell $c_j$ and do the cell-level scheduling.

[Step 2a': Also keep track of scheduling state for sequence-dependent setup costs].

Step 2b: Record the completion time of job $j_i$ in cell $c_j$ as $t_{ij}$.

Step 2c: Undo cell-level scheduling for job $j_i$ in cell $c_j$.

Step 3: Let $j^*=\mathrm{argmin}_{j\in[1, C]}t_{ij}$, then record cell $c_j^*$ as the earliest-completion-time cell.

Step 4: Assign job $j_i$ to the earliest-completion-time cell $c_j^*$.

Step 5: Do cell-level scheduling within earliest-completion-time cell $c_j^*$ for job $j_i$.

Step 6: Remove job $j_i$ from the shop-level queue.

Step 7: If new jobs have arrived, insert them into the shop-level queue in order.

Step 8: If the shop-level queue is not empty, go to Step 2; Otherwise go to Step 7.

It is mentioned the to-be-described embodiment uses a "push" model in assigning jobs to cells as done in existing schedulers. However, it does so in a significantly more flexible way that does not assume a pre-determined mapping from jobs to cells. Instead of having two separated scheduling phases (one for the shop-level and one for the cell-level) running in tandem, this new system and approach performs these two steps at once when a job is scheduled. Determining to which cell a job is assigned is based on the current workload of all cells given all the jobs that have been scheduled so far. The new design tries out all possible ways of assigning a job to cells, and picks the cell that finishes the job the earliest. Thus, it is called herein "earliest-completion-time" scheduling.

Now, therefore, with continuing attention to process 600 of FIG. 6, all jobs that arrive at the system are stored in an ordered shop level queue 602 (Step 1 of pseudocode). The ordering of the jobs in the queue may be based on their due dates, their arrival dates, processing times or other ordering parameter.

It is also to be noted at this time, that in process 600, jobs and batches are handled naively in the sense there is not a distinction made between jobs or batches. Therefore, if a job has a single item, it may not be divided into batches. However, for jobs of large complexity, there may be a large number of batches into which the job has been broken.

Next, the process selects a job (or batch) from the top of the shop level queue (604), and then assigns the job (or batch) to a cell to perform cell-level scheduling (606). As part of this operation, scheduling state for sequence-dependent set-up cost is tracked (608). Then using this information, the completion of the job (or batch) within the cell is recorded (step 610). Thereafter, the process will undo the previously completed cell-level scheduling for the job (or batch) in the cell, and repeats steps 606-610 for all eligible cells that may receive the job (or batch). These processes are defined in the pseudo code as Steps 2, and Substeps 2a, 2a', 2b and 2c.

Next, the process determines the fastest completion time for the job (or batch) and the corresponding cell generating such completion time is recorded as the earliest batch completion time cell. This is shown in Step 3 of the pseudocode by "j*=argmin", where "argmin" stands for the argument of the minimum. This is understood in the art to define the set of points of a given argument for which the value of the given expression attains its minimum value.

Thereafter, the job or batch being investigated is assigned to the earliest completion-time cell and corresponding Step 4 of the pseudo code.

Thereafter, the process performs cell-level scheduling within the earliest completion time cell for the job (or batch) 618 (Step 5 of the pseudo code).

The scheduled job (or batch) is then removed from the shop level queue 620 (Step 6 of the pseudo code), and any new job (or batch) which has been received is inserted into the shop level queue in the appropriate order or position 622 (pseudo code Step 7).

Lastly, a determination is made in step 624 whether the shop level queue is empty. If it is determined to still have jobs or batches, the process returns to step 622, and a new job is entered. If not, this is just a continuous loop until a new job is inserted. On the other hand, if the shop level queue is not empty, the process returns to step 604 (Step 8 of the pseudo code), and the process continues.

Since the earliest-completion-time algorithm does not assume a static mapping from jobs to cells, it allows different batches of the same job to be assigned to different cells for improved throughput. This flexibility is particularly valuable to processing heavy-tailed jobs. Current LDP schedules do not provide such flexibility, since they are not designed to handle jobs with these characteristics.

It is understood that while the earliest-completion-time scheduler or scheduling algorithm helps to reduce the peak cell-level work in progress (WIP), it may also increase the shop-level WIP, due to the need to assemble finished batches from multiple cells. So there is a trade-off between shop-level and cell-level WIPs that need to be balanced out. Two methods are described and illustrated in FIGS. 7 and 8 to achieve such a balance. The first process (FIG. 7) acts to localize the shop-level WIP generated by enforcing scheduling constraints such that only the immediate (or close enough) neighbors of a cell can share batches from the same job. This guarantees that batches of the same job will not get overly distributed throughout the physical print shop, and only a localized subset of cells will be eligible for processing these same-job batches.

Figure 7:
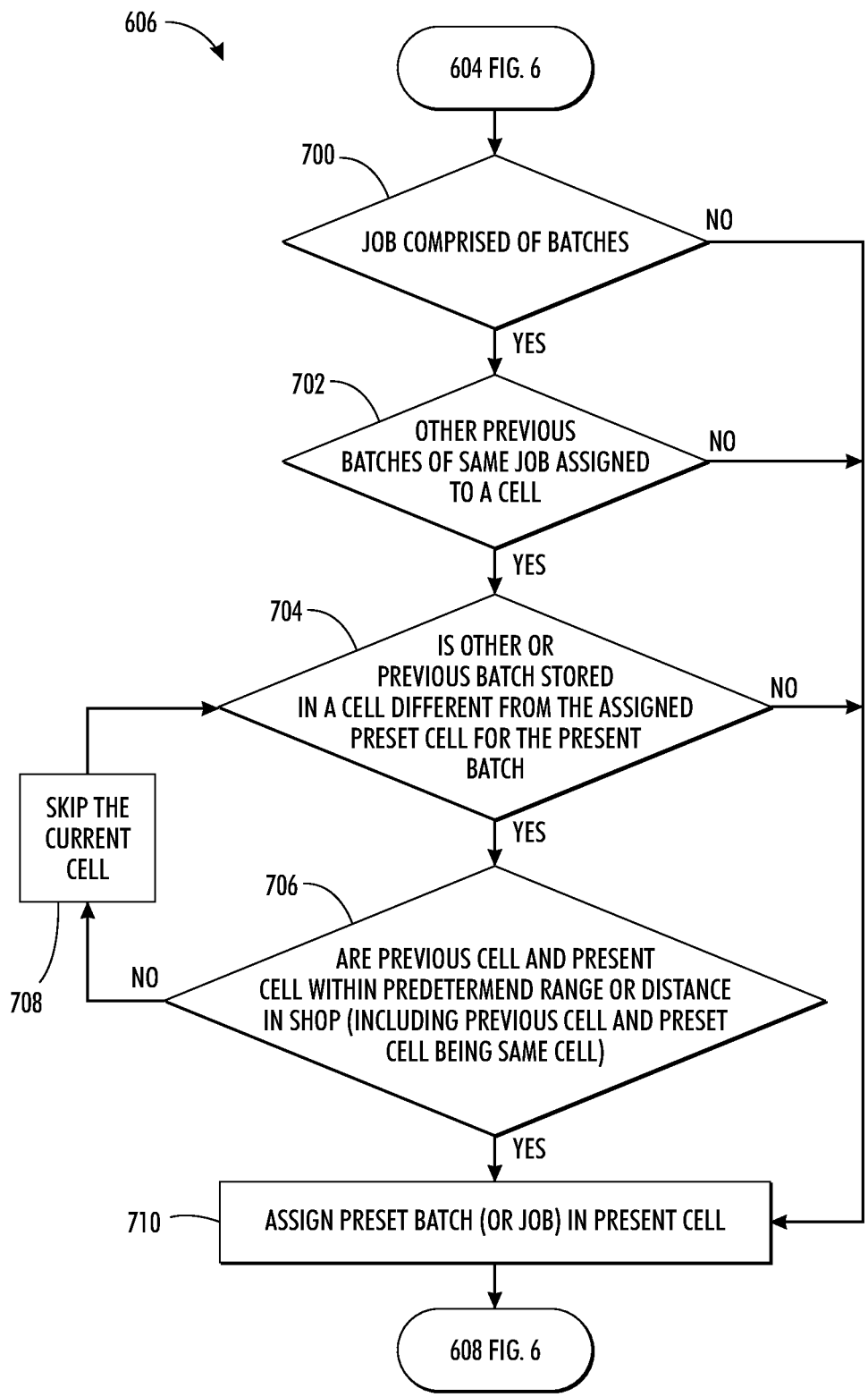
FIG. 7 illustrates the flow of FIG. 6, including the concept of localizing shop-level work in progress (WIP)

Particularly, the process of FIG. 7 may be incorporated into or be part of step 606 of FIG. 6. In step 700, a determination is made whether or not the job is comprised of batches. If this is the case, the process moves to step 702, where a determination is made whether any other previous batches of the same job are assigned to any cell. When it is determined a previous batch of the same job is assigned to some cell, the process moves to step 704, where a determination is made whether or not the previous batch is stored in a cell different than the present cell being investigated. If this situation exists, the process moves to step 706, and the process investigates whether the previous cell and the present cell are within a predetermined range or distance in the shop. This includes having the previous cell and the present cell being the same cell. If in step 706, the present cell is outside the range from the previous cell, the process skips the current cell 708 and moves back to step 704 to allow the system to investigate other cells which may meet the criteria of the process of FIG. 7. On the other hand, if in step 706, the previous cell and present cell are within the predetermined range, the present batch is assigned to the present cell (step 710), and the process continues. If in steps 700, 702 or 704 the criteria are not met, the process assigns the present batch or job to the present cell.

Figure 8:
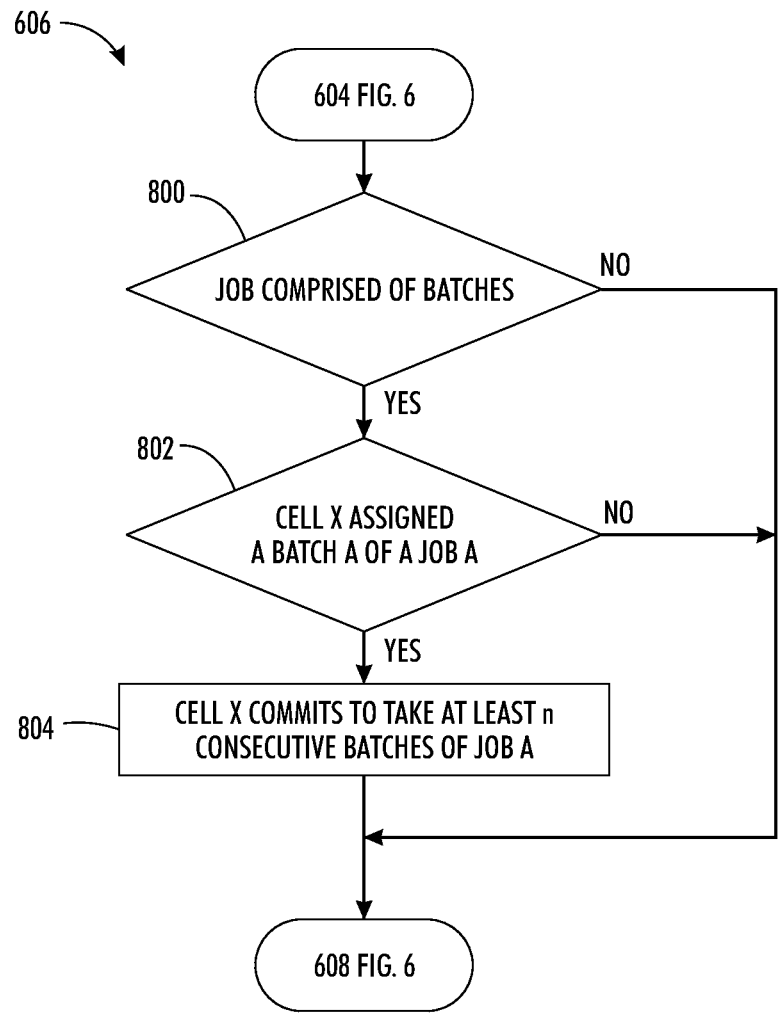
FIG. 8 illustrates the flow of a constraint to provide some minimum of continuous batches to a same cell.

The second method as illustrated by FIG. 8 imposes an additional restriction on how batches are divided among cells by enforcing the following constraint: once a cell takes a certain job, it must also take the next n number of consecutive batches from the same job, where n is a parameter that controls the trade-off between the assembly complexity of the shop-level WIP and the flexibility with which batches of the same job can be distributed.

It is noted the flow of FIG. 8 may also be a process within the operations of step 606. In this regard, therefore, at step 800, similar to FIG. 6, a determination is made whether or not the job is comprised of batches. If it is comprised of batches, the process moves to step 802, and a determination is made whether a cell such as cell X has been assigned to a batch A of a job A, where batch A is defined as either the first batch of a job or the first batch that is from a different job than the previous batch. If this has occurred, then the process moves to step 804, where cell X then is committed to take at least "n" consecutive batches from job A, including the batch it has already taken. After that, cell X is free to take a batch from another job, but it doesn't have to. That is why the approach is called minimum consecutive batches, as there is no upper bound on the consecutive batches a cell may take. If on the other hand in steps 800 and 802 the determination is negative, the process bypasses step 804 and continues in the process, as illustrated in FIG. 6.

In the process of FIG. 8, if n is infinite, then the new scheduling algorithm effectively reduces to existing LDP solutions; whereas using an n of 1 re-produces the earliest-completion-time algorithm described in FIG. 6 above. However, with a carefully-chosen n that falls somewhere in between 1 and ∞, this method has the ability to capture a spectrum of trade-offs which can strike a more productive balance between shop-level and cell-level WIPs.

Figure 9:
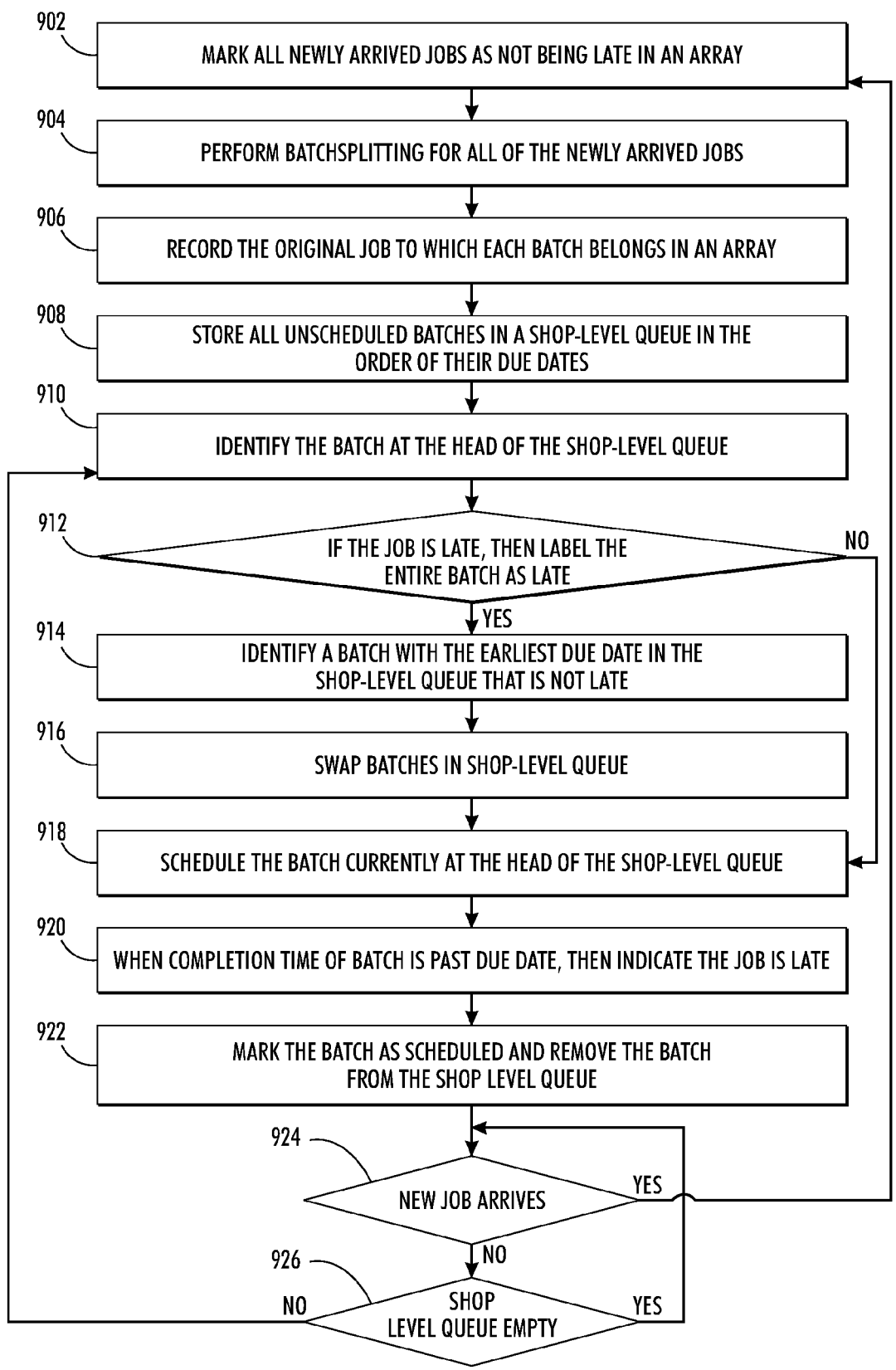
FIG. 9 presents a flowchart of the minimization of the number of late jobs method.

Referring to FIG. 9 and the pseudo code defined by Step 1-Step 11 below, a computationally efficient way to minimize the number of late jobs is described.

Step 1: Mark all newly arrived jobs $j_k (k \in [1, J])$ as being not late in an array JobIsLate[$j_k$] (i.e., JobIsLate[$j_k$]=false)
Step 2: Do batch-splitting for all of the newly arrived jobs
Step 3: For all batches $b_i (i \in [1, B])$, record the original job to which $b_i$ belongs in an array JobOfBatch[$b_i$].
Step 4: Store all the unscheduled batches in a shop-level queue in the order of their due dates (i.e., earliest due date first).
Step 5: Let $b_i (i \in [1, B])$ be the batch at the head of the shop-level queue.
Step 6: If JobisLate[JobOfBatch[$b_i$]]=true (i.e., the batch belongs to a late job) then,
  Step 6a: Let $b_j$ be the batch with the earliest due date in the shop-level queue such that JobIsLate[JobOfBatch[$b_j$]]=false,
  Step 6b: If $b_j \neq$ nil, then swap batches $b_i$ and $b_j$ in the shop-level queue (i.e., $b_i \leftarrow b_j$).
Step 7: Schedule the batch $b_i^*$ that is currently at the head of the shop-level queue.
Step 8: If the completion time of batch $b_i^*$ is past due date, set JobIsLate[JobOfBatch[$b_i^*$]] to true
Step 9: Mark batch $b_i^*$ as scheduled and remove it from the shop-level queue.
Step 10: If new jobs have arrived then, go to Step 1.
Step 11: If the shop-level queue is not empty, go to Step 5; Otherwise go to Step 10.

The to-be-described process keeps track of which batch belongs to which job, and whenever a batch is scheduled, the process updates the status of the corresponding job based on whether the batch is late or not. A job is marked as being late, if at least one of its batches is late. By maintaining the list of late jobs and their corresponding batches, this process quickly determines if a batch belongs to an already-late job, and if so, it allows a not-yet-late batch with the earliest due date to jump to the head of the shop-level scheduling queue.

In system/process 900, all newly-arrived jobs are marked as not being late and are placed into "job-time" array 902 (Step 1 of the pseudo code). Then a batch splitting operation is performed for all newly-arrived jobs in step 904 (Step 2 of pseudo code). Next, the original job to which each batch belongs in the job-time array is recorded 906 (Step 3 of pseudo code as JobOfBatch). Thereafter, all unscheduled batches in a shop-level queue are stored in the order of their due dates, such as earliest due date first 908 (Step 4 of pseudo code). Of course, other criteria may be used for the ordering.

In step 910, the batch at the head of the shop-level queue is identified (Step 5 of pseudo code), and if as in step 912 the job is late, then each of the batches associated with that job are identified as being late (Step 6 of pseudo code). When the present job is late, the system then identifies a batch with the earliest due date in the shop level queue that is not late 914 (Step 6a of pseudo code), then the existing batch ($b_i$) is switched with the newly identified batch ($b_j$) in the shop-level queue 916 (Step 6b of pseudo code). The process schedules the batch currently at the head of the shop-level queue 918 (pseudo code Step 7). When in step 920 the completion time is past the due date, the process indicates that the entire job is late (pseudo code Step 8). Then the late batch is marked as being scheduled 922, and removed from the shop-level queue (pseudo code Step 9).

At this point the process moves to step 924, wherein an inquiry is made as to whether any new jobs have arrived. If new jobs have arrived, the process returns to step 902 and the process continues (pseudo code Step 10). If on the other hand in step 924 no new jobs have arrived, the process moves to step 926 where a determination is made as to whether the shop-level queue is empty. When the shop-level queue is determined to be empty, the process cycles back to step 924 to search for the arrival of new jobs or batches. On the other hand, if the shop-level queue is not empty, the process moves to step 910, and the process continues (Step 11 of pseudo code).

It is worth mentioning the above-described job scheduler, which generates a job schedule for job production, does a good job of minimizing the overall makespan print job, if each cell runs a scheduling algorithm that minimizes the cell-level makespan. An alternative implementation of the shop-level queue is to sort all the unscheduled batches such that (1) all batches belonging to not-yet-late jobs come before batches of already-late jobs and (2) batches within the same class (already-late or not-yet-late) are ordered in their due dates. An advantage of using the job scheduler outlined above instead of the alternative is that, as long as the due dates of the jobs don't change, the shop-level queue does not need to be re-sorted until new jobs arrive. Another advantage is that it is easier to accommodate other scheduling constraints. For example, it is often undesirable to let a few long jobs wait indefinitely. To avoid this, a constraint can be added to Step 6a of pseudocode that requires not only $b_j$ must belong to a not-yet-late job but its due date be close enough to the due date of batch $b_i$ for $b_j$ to jump to the head of the queue. Such requirements would prevent an old job from waiting in the shop-level queue forever, because eventually all in-coming jobs will have a due date late enough to prevent the old job from being further preempted by others.

From a priority-based scheduling viewpoint, the job scheduling algorithm illustrated in FIG. 9 and pseudocode Step 1-Step 11 in this application can be understood as one that assigns each batch a dynamic priority based on the status of its corresponding job. Thus, this approach is called dynamic priority-based scheduling. Its advantages over the fixed-priority scheduling policy are described next.

In the fixed approach, there is little, if any, feedback from the cell-level scheduler to the shop-level scheduler. For example, if a particular cell is being heavily utilized at a particular time of the day, the shop-level scheduler would have no way of knowing this, and as long as the cell's workload averaged over a long period of time is not significantly higher than the rest of the cells, the shop-level scheduler may assign a job with an imminent due date to further strain the resources in the cell. In the new approach, the feedback is immediate because if a cell is being overloaded, the completion time for a new job (or batch) when it is assigned to the cell would be delayed significantly, forcing the shop-level scheduler to try to find another cell that is less busy. According to Step 3 of the pseudocode in the earliest-completion-time algorithm (e.g., see also the flow diagram of FIG. 6), only the cell that can finish processing the current job (or batch) at the earliest time will be selected as the cell to which the job (or batch) is assigned. Note that this feedback is achieved when the actual scheduling of a job (or batch) within a cell is carried out at the same time when the shop-level scheduler is determining the cell to which the job (or batch) should be assigned. Without the simultaneous optimization of the two scheduling tiers, the link that provides the feedback from the cell-level scheduling to the shop-level would be missing, resulting in sub-optimal scheduling performance. The earliest-completion-time algorithm has been implemented and tested on real print shop data with heavy-tailed job size distributions and sequence-dependent setup costs.

The search aspects of both the earliest-completion-time algorithm and the minimization of late jobs algorithm both may employ a greedy algorithm, which is any type of algorithm that follow the problem solving heuristic of making the optimal local choice at each stage of a decision process in hopes that this may provide the optimal global choice. Such a greedy algorithm has a candidate data set, a selection function for choosing the best candidate, a feasibility function to evaluate the selected candidates, an objective function that assigns a value to a solution set, and a solution function which determines when the complete solution has been derived and the procedure should end.

Figure 10:
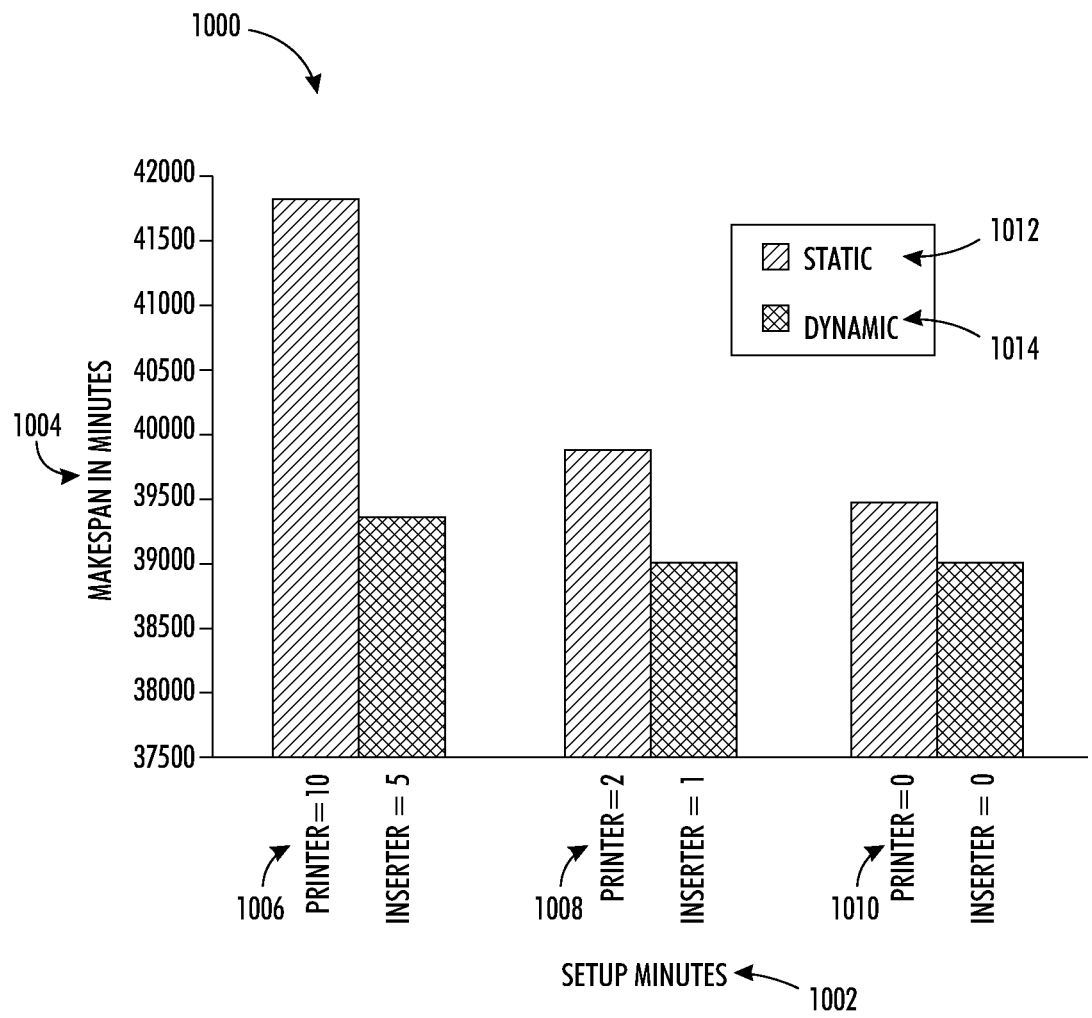
FIG. 10 presents a graphical test results demonstrating that the enabled dynamic strategy reduces makespan.

Referring to FIG. 10, in graph 1000 the X-axis represent setup times 1002 and the Y-axis on the left shows the makespan 1004, wherein a makespan is defined as the last finishing time of a given job or the time difference between the start and finish time of a sequence of jobs or tasks. Three different setup times 1006, 1008, 1010 are presented as are two scheduling process types, a static process (used in existing schedulers) 1012 and a dynamic process 1014 used in the present scheduler. It can be seen that the dynamic process 1014 decreases the makespan as compared to the static process 1012.

Figure 11:
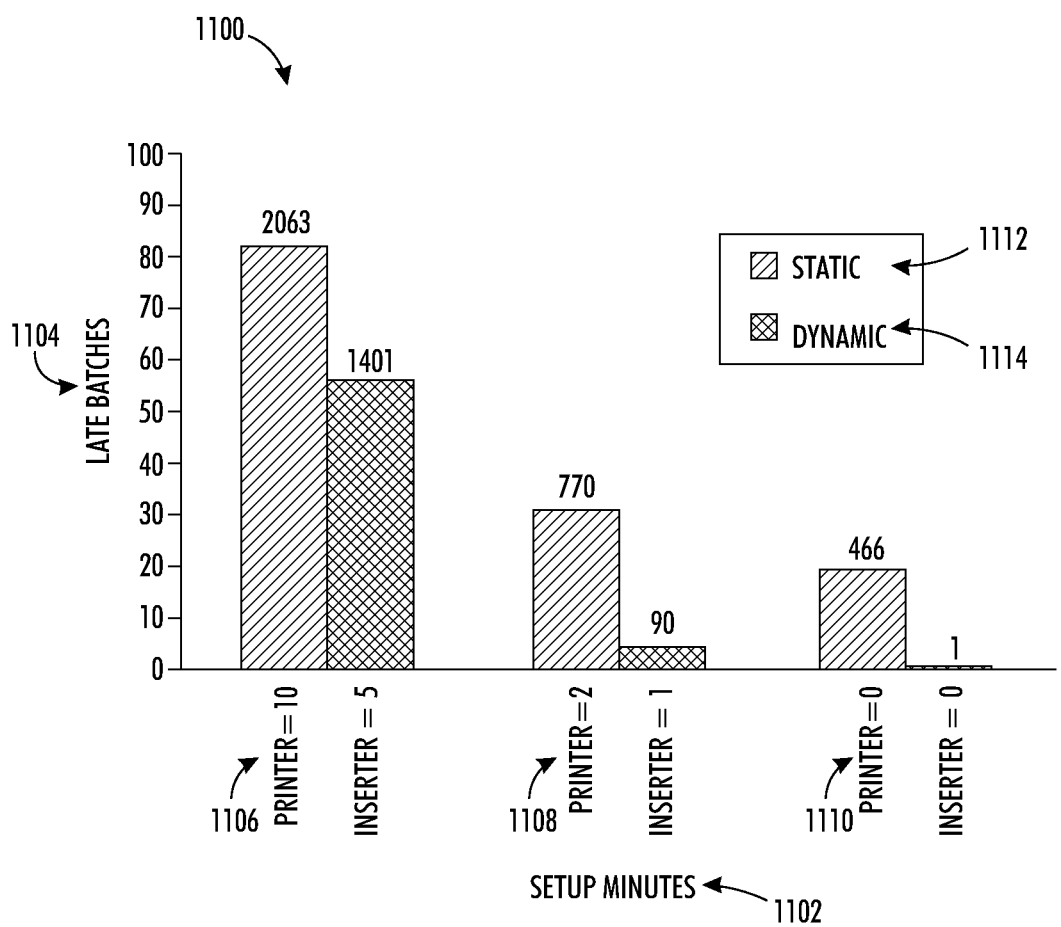
FIG. 11 presents a graphical test results demonstrating that the enabled application of the late batch minimization scheduling reduces late batches.

Referring to FIG. 11, graph 1100 shows the number of batches that are late. The X-axes represent setup times 1102 and the Y-axis shows the makespan 1104. Three different setup times 1106, 1108, 1110 are presented for the static process 1112 and the dynamic process 1114. The number of late batches is identified when the static process 1112 is used, and when dynamic process 1114 is used.

As can be seen, the dynamic process reduces both the makespan and the number of late batches significantly. The running time of either the static or the dynamic algorithm is less than 3 seconds on a desktop machine with 2.0 GHz Intel Xeon processor (no parallelization is used).

Among the advantages of the dynamic priority-based scheduling process of FIG. 9 (and pseudocode Step 1-Step 11) is that it makes it possible to efficiently compute an order in which different batches can be scheduled in the shop-level queue. It can be shown that the worst-case time complexity of the algorithm is $O(J^2)$, where J is the total number of jobs, multiplied by the complexity of scheduling a job (or batch) in a single cell. It is mentioned that all the algorithms described in this application do not specify which algorithm to use at the cell scheduling level. As long as there is a way to tell the completion time of a scheduled batch in a cell, any scheduling algorithm can be used at the cell level. Another advantage is that the algorithm can significantly reduce the number of late jobs, while keeping the total makespan roughly the same or slightly shorter.

The described scheduler has been implemented in C and tested against an existing LDP scheduler on the same real print shop data with large print volume (~60M pages and ~40M envelopes). The batch size is fixed at 10K pages for the new algorithm; whereas in existing LDP schedulers, it is left as an open parameter for further optimization. In other words, if everything else is the same, then the LDP software should have an advantage, since it can adjust the batch size to improve its performance. However, due to its fixed-priority batch scheduling policy, the existing LDP scheduler ended up delaying quite a large number of jobs that could have been avoided, if a dynamic-priority batch scheduling algorithm is used instead. For the same print shop setup and job mix, the newly described scheduler is able to reduce the number of late jobs from 1882 down to only 116, while at the same time shortening the makespan by 4.4 hours for one month worth of printing. It is noted that the average utilization level of a printer in a cell is already above 96% in the existing LDP solutions, so even small reduction in makespan is non-trivial to achieve.

While reduction in the number of late jobs achieved by the new scheduler is by more than an order of magnitude over the existing scheduler, a few things warrant special attention. The first is the heavy-tailed job size distribution, which is prevalent in the test data used. This implies that job sizes can vary so dramatically that the number of late jobs is no longer proportional to the number of pages that are printed late, for example. Since the existing LDP scheduler is not designed for heavy-tailed distributions, its performance is actually quite respectable. However, testing results do show that it is possible to significantly cut down the number of late jobs without sacrificing (or even slightly improving) the makespan of all jobs. In addition to significantly reducing the number of late jobs, the new C implementation also runs a few times faster, despite the fact that it must evaluate multiple cell-assignment alternatives before committing a job to a cell.

Further, the following illustrated test results are for a scheduler that controls the tradeoff between maximizing productivity at the cell level and minimizing WIP at the shop level by using the previously discussed concept of forcing the cell to which a batch is assigned, to take at a minimum the next n−1 batches from the same job (subject to job length, of course) to reduce the complexity of assembling the finished batches that belong to the same job.

Figure 12:
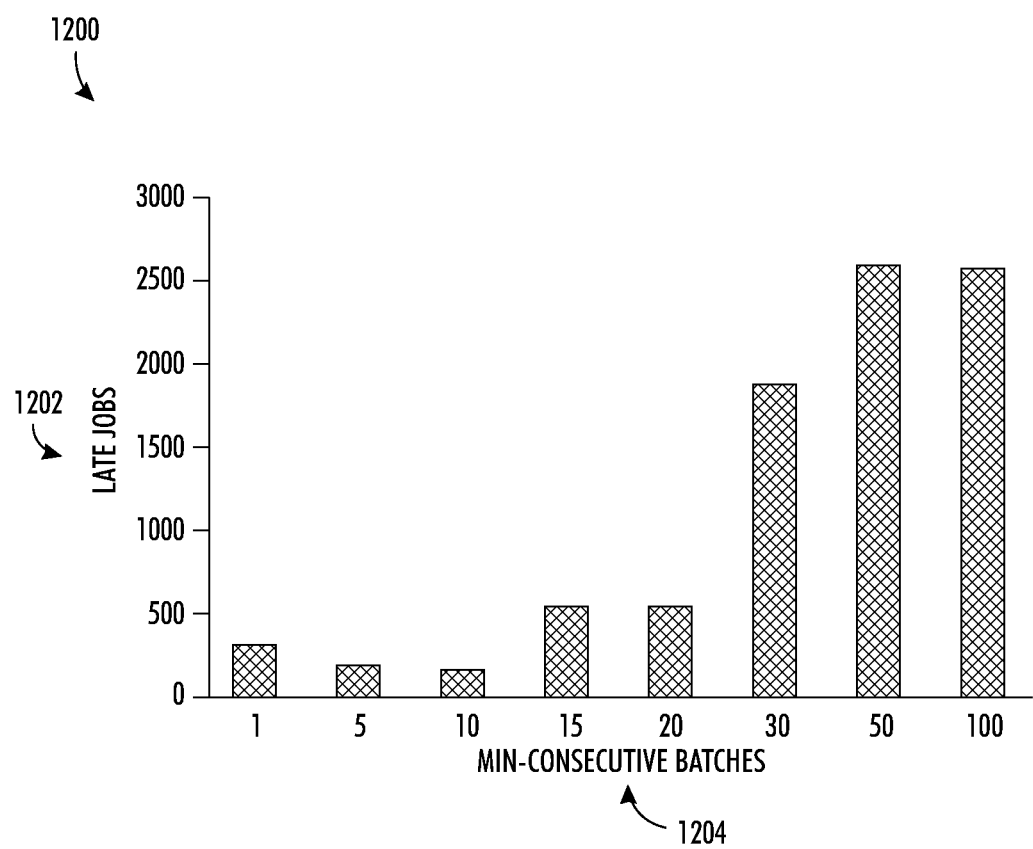
FIG. 12 presents graphical test results demonstrating the effectiveness of the minimum consecutive batches on reducing the number of late jobs.

Referring now to FIG. 12, a graph 1200 of the current computational results demonstrate how minimizing the number of late jobs 1202 shown is achieved by varying n, which is referred to here as the "min-consecutive batches" 1204. It is interesting to see that the best value for n is neither 1 nor ∞ or a large enough number such as 50 or 100 in these figures. Theoretically, the best values of n should include 1, since it does not impose any restriction on the search space of feasible job schedules, and should not be a large number (e.g., 100) as this increases late jobs. However, because local search is used, and some random perturbation is introduced to help it get out of local minima, having various n's actually helps the algorithm in reaching otherwise unexplored search spaces that contain better job schedules.

Figure 13:
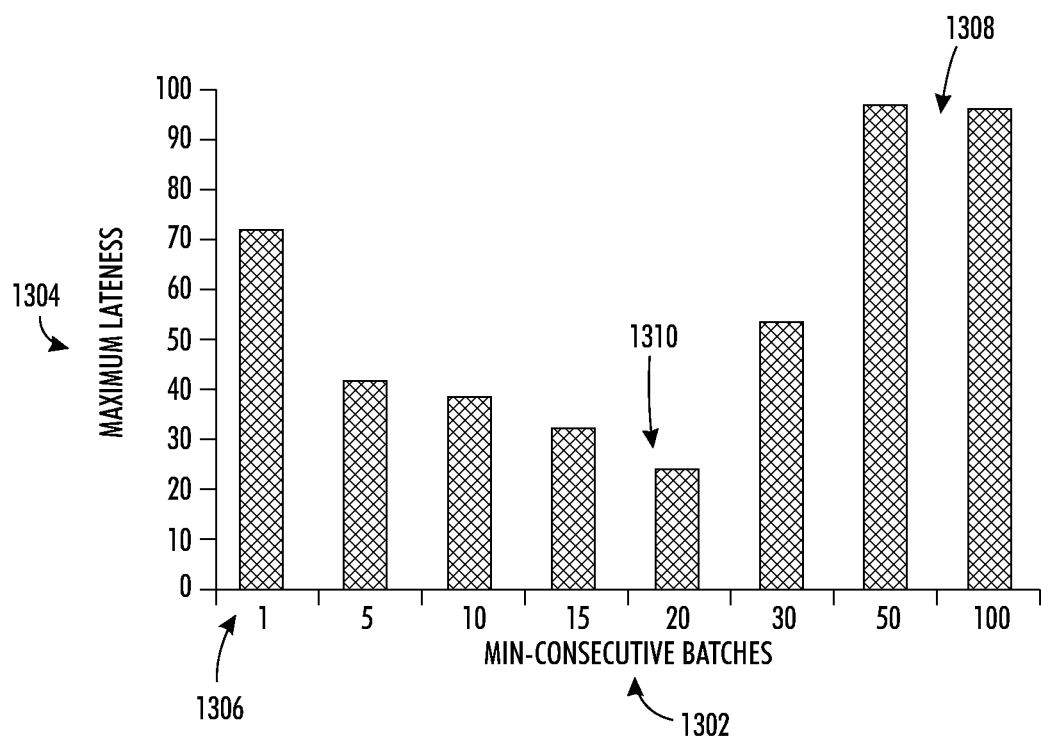
FIG. 13 presents graphical test results demonstrating enablement of minimum consecutive batches reduces maximum lateness.

Referring to FIG. 13, a graph 1300 of the current computational results demonstrate how varying the number of "min-consecutive batches" 1302 may also reduce lateness 1304. Here, when n is equal to 1 (having only one batch), lateness is high (e.g., 1306), and when batches are large lateness is also large (e.g., 1308). However when n is at a middle value lateness is reduced (e.g., 1310).

Although there is a tradeoff between minimizing the number of late jobs shown in FIG. 12 and minimizing the maximum lateness of any job as shown in the FIG. 13, it is clear that having an intermediate value of n can actually do better in terms of both criteria. Since the computation of a schedule for a single n can be done very fast, the local search algorithm can simply try out many candidate values of n, and pick the one that achieves the best tradeoff.

Variations of the current embodiment may be obtained by varying the scheduling algorithm used at the cell level to create systems of (slightly) different scheduling patterns. On the implementation side, the shop-level queue could use various data structures including a sorted link list, or a heap-based priority queue. In Step 6a of the dynamic priority-based scheduling algorithm, variations of the current embodiment can be created to take into account additional scheduling constraints such as limiting the maximum waiting time of an existing job by checking the arrival, the due date, or some combination of both arrival and due date, of the batches in the shop-level queue when dynamically calculating the priority of a batch.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The present application provides a method of balancing the workload across multiple cells in a cellular manufacturing environment by assigning jobs to their earliest-completion-time cells. The method may trade-off shop-level WIP with cell-level WIP. The method may also re-order the priority of job batches to minimize the number of late jobs by differentiating batches that belong to late jobs from the ones that do not. The method may further extend to assign jobs to cells that optimize other metrics including, but not limited to, one that minimizes the processing time of a job, maximizes the time slack before the due date of a job, and so on. The method may further extend to different ways of breaking ties between batches with the same or similar earliest due dates, including using tie-breaking rules that favor minimum processing time, least slack, or earliest arrival time.

The present application also include a system that utilizes the aforementioned methods to achieve improved scheduling performance for cellular manufacturing with batch-splitting. The system also may include parallel implementations of the earliest-completion-time algorithm and/or the dynamic batch scheduling algorithm for improved system performance.

The invention claimed is:

1. In a manufacturing shop having a plurality of production devices arranged in a cellular manufacturing environment, including a plurality of cells, with each of the plurality of cells containing at least one of the plurality of production devices, a method of balancing workload across the plurality of cells in the cellular manufacturing environment, the method comprising:

compiling a listing of a plurality of jobs and the plurality of cells wherein the plurality of jobs are to be produced by at least some of the plurality of cells, and each of the cells include at least one production device;

dividing jobs determined to be above a certain size into batches;

assigning the jobs not divided into batches to the cells using an earliest-completion-time algorithm, wherein a specific job is assigned to a job specific cell that provides an earliest completion time for the specific job;

assigning the batches of the jobs determined to be above the certain size to the cells using the earliest-completion-time algorithm, wherein a specific batch is assigned to a batch specific cell that provides the earliest completion time for the specific batch; and generating a job schedule for job production based on the results of the earliest-completion-time algorithm, wherein the generating of the job schedule includes using information from a shop level scheduler and a cell level scheduler, wherein the shop level scheduler and the cell level scheduler are in communication with each other to provide information regarding an amount of work to be accomplished at the shop level (shop-level work in progress) and an amount of work to be accomplished at the cell level (cell-level work in progress), and further including trading off between the shop-level work-in-progress and the cell-level work-in-progress to optimize the job schedule, wherein the method is performed using at least one computer operable processor.

2. The method according to claim 1 wherein the trading off between the shop-level work-in-progress (WIP) and the cell-level work-in-progress (WIP) includes requiring a batch to be sent to a cell within a predetermined physical distance of another cell which has received a batch from a same job.

3. The method according to claim 1 wherein the trading off between the shop-level work-in-progress (WIP) and the cell-level work-in-progress (WIP) includes requiring a cell that received a previous batch of a job having a plurality of batches to take at least n−1 additional consecutive batches from that same job.

4. The method according to claim 1 further including employing a dynamic-priority-based-scheduling process for re-ordering job priorities to minimize late jobs by differentiating between batches that belong to late jobs from batches that do not belong to already-late jobs.

5. The method according to claim 4 further including for jobs that are not already late, breaking ties among batches that have at least one of a same or similar earliest due date by selecting the next batch to be processed based on at least one of: a minimum processing time of the job associated with the batch or the batch itself, a least slack time to due date of the job, or an earliest arrival time of the job to the system.

6. The method according to claim 1 wherein the step of assigning jobs to cells is performed to achieve at least one of: a minimizing of the processing time of a job or a maximizing of a slack time before a due date of a job.

7. The method according to claim 6 wherein the dividing at least some of the jobs into batches further includes:
assigning the batches to the cells using the same criteria used in the step of assigning the job.

8. The method according to claim 1 further including implementing the earliest-completion-time algorithm and the dynamic-priority-based-scheduling algorithm in parallel.

9. In a cellular manufacturing system having a plurality of production devices arranged in a cellular manufacturing environment, including a plurality of cells, with each of the plurality of cells containing at least one of the plurality of production devices, the cellular manufacturing system comprising:

a printing workflow system including a computer operable server configured to operate at least one of an earliest-completion-time algorithm and/or a dynamic-priority-batch-scheduling algorithm for application to at least one of jobs and/or batches of jobs, the earliest-completion-time algorithm and/or the dynamic-priority-batch-scheduling algorithm generating a production schedule for the manufacturing of the jobs and/or batches by the cellular manufacturing system, wherein when a job is above a certain determined size, the job is divided into batches, and wherein the generation of the production schedule includes use of information from a shop level scheduler and a cell level scheduler, the shop level scheduler and the cell level scheduler in communication with each other to provide information regarding an amount of work to be accomplished at the shop level (shop-level work in progress) and an amount of work to be accomplished at the cell level (cell-level work in progress), and further including trading off between the shop-level work-in-progress and the cell-level work-in-progress to optimize the job production schedule;

the plurality of cells arranged for producing the job and/or the batch of the job in accordance with the job production schedule; and at least one communication link between the printing workflow system and the plurality of cells, for communication of the job production schedule.

10. The system of claim 9, wherein the earliest-completion-time algorithm operated by the server, minimizes work-in-progress at the shop-level and maximizes productivity at the cell-level, by:

storing all arrived jobs or batches in a shop-level queue ordered by due date;

selecting a job from the top of the shop-level queue; and assigning the selected job to a cell and performing cell-level scheduling, tracking the scheduling state for sequence-dependent setup costs, recording the completion time of the job in the cell, and undoing the cell-level scheduling for the job in the cell;

finding a job that is completed first and record a corresponding cell as the earliest-completion-time cell;

assigning the job to the earliest-completion-time cell;

performing cell-level scheduling within earliest-completion-time cell for the job;

removing the job from the shop-level queue;

inserting any new job into the shop-level queue in order of their due date or at the head of the shop-level queue; and if the shop-level queue is not empty, select a new job, otherwise insert the new job.

11. The system of claim 9, wherein the printing workflow system contains a batch-scheduling-algorithm that determines a list of late jobs by:

marking all newly arrived jobs as not being late in a job-time array;

performing batch-splitting for all of the newly arrived jobs that are above the determined size;

store the newly arrived job to which each batch belongs in a batch-job array;

store all unscheduled batches in a shop-level queue in the order of their due dates;

identifying a batch at the head of the shop-level queue;

if the batch at the head of queue is associated with a late job, label the batch at the head of the queue and all batches of the corresponding job as late then:

set a new batch of a new job to be the earliest due date in the shop-level queue; and if the shop-level queue is not empty, then swap late batch of late job and new batch of new job in shop-level queue;

scheduling the new batch currently at the head of the shop-level queue;

if the completion time of new batch is past due date, then indicate the new job associated with the new batch is late, else no indication that job is late;

marking the new batch as scheduled and removes the new batch from the shop-level queue;

if a new job arrives, then go to step of marking all newly arrived jobs as not being late in the job-time array; and if the shop-level queue is not empty, then put a new job at head of shop-level queue, otherwise go to step of marking all newly arrived jobs as not being late in the job-time array.

12. In a manufacturing shop having a plurality of production devices arranged in a cellular manufacturing environment, including a plurality of cells, with each of the plurality of cells containing at least one of the plurality of production devices, a method for re-ordering a priority of batches of jobs to minimize the number of late jobs in the cellular manufacturing system the method comprising:

compiling a listing of a plurality of jobs and a plurality of cells, wherein the plurality of jobs are to be produced by at least some of the plurality of cells and each of the cells includes at least one production device;

dividing the jobs into batches when the jobs are above a predetermined size;

applying a dynamic-priority-based-scheduling-algorithm to the batches to identify and minimize late batches to derive a set of jobs and cell associations; and generating a job schedule for job production based on the results of at least one of the dynamic-batch-scheduling algorithm and/or an earliest-completion-time algorithm, wherein the generating of the job schedule using the earliest-completion-time algorithm includes using information from a shop level scheduler and a cell level scheduler, wherein the shop level scheduler and the cell level scheduler are in communication with each other to provide information regarding an amount of work to be accomplished at the shop level (shop-level work in progress) and an amount of work to be accomplished at the cell level (cell-level work in progress), and further including trading off between the shop-level work-in-progress and the cell-level work-in-progress to optimize the job schedule, wherein the method is performed using at least one computer operable processor.

13. The method of claim 12 wherein the applying of the earliest-completion-time algorithm to the batches, is undertaken when a specific batch is assigned to a specific cell that provides an earliest completion time for the specific batch.

14. The method according to claim 12 further including implementing the earliest-completion-time algorithm and the dynamic-priority-based-scheduling algorithm in parallel.

15. The method according to claim 12 wherein employing the dynamic-batch-scheduling process re-orders job priorities to minimize late jobs by differentiating between batches that belong to late jobs from batches that do not belong to already-late jobs.

16. The method according to claim 15 further including for jobs that are not already late, breaking ties among batches that have a same or similar earliest due date by selecting the next batch to be processed based on at least one of: a minimum processing time of the job associated with the batch or the batch itself, a least slack time to due date of the job, or an earliest arrival time of the job to the system.

* * * * *